Figure 5:
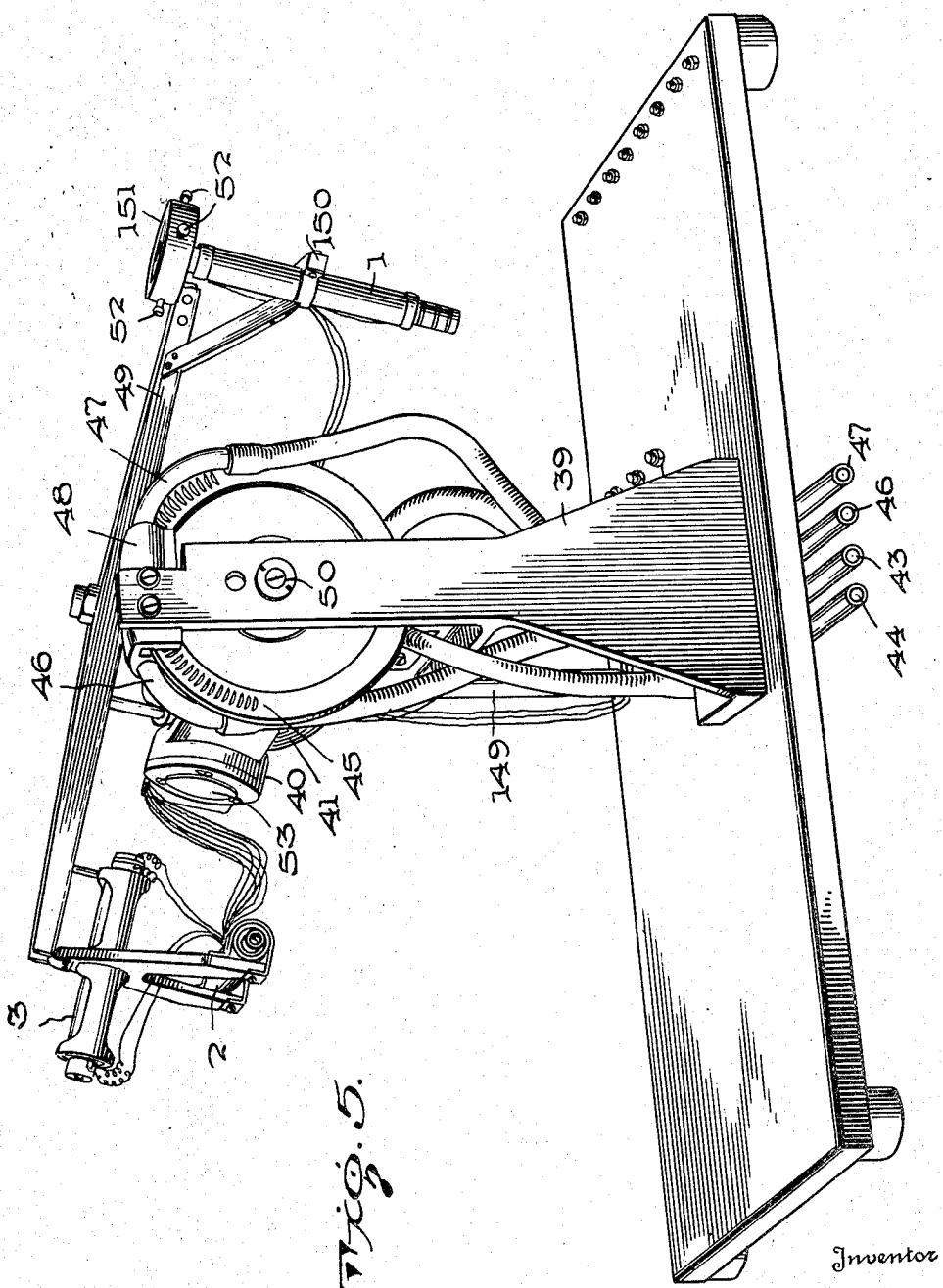

Aug. 15, 1950     R. D. WYCKOFF     2,518,513
METHOD AND APPARATUS FOR MEASURING MAGNETIC FIELDS
Filed July 5, 1945     7 Sheets-Sheet 1
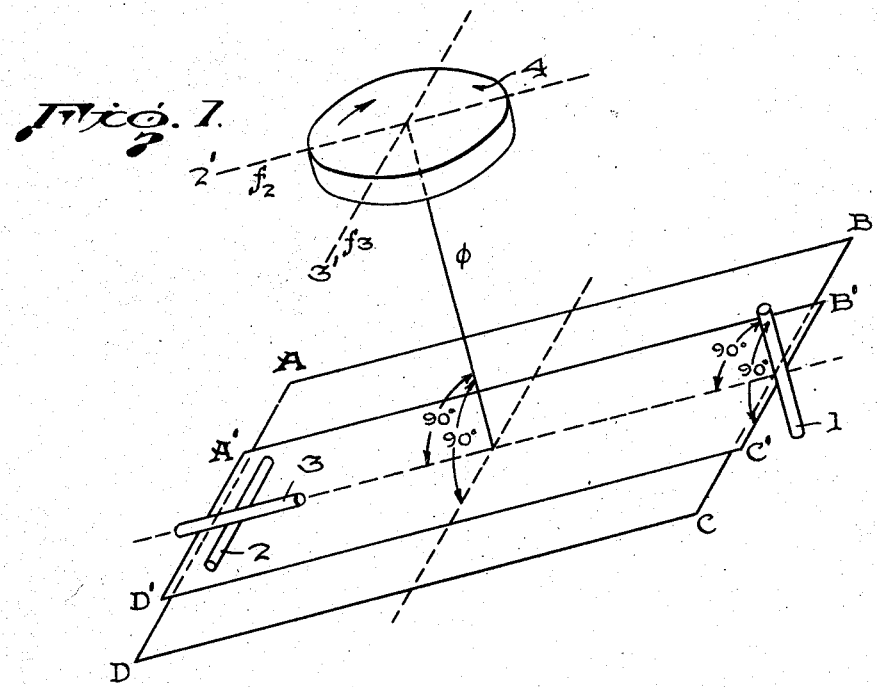
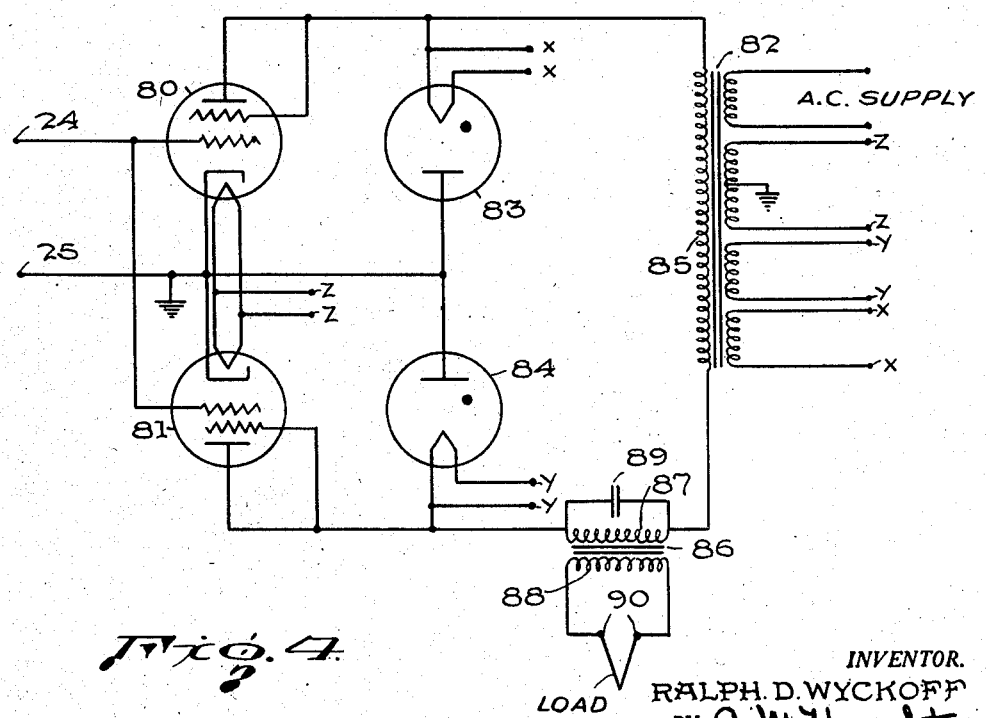
INVENTOR.
RALPH. D. WYCKOFF
BY *A. M. Houghton*
*his* ATTORNEY Aug. 15, 1950 R. D. WYCKOFF 2,518,513
METHOD AND APPARATUS FOR MEASURING MAGNETIC FIELDS
Filed July 5, 1945 7 Sheets-Sheet 2
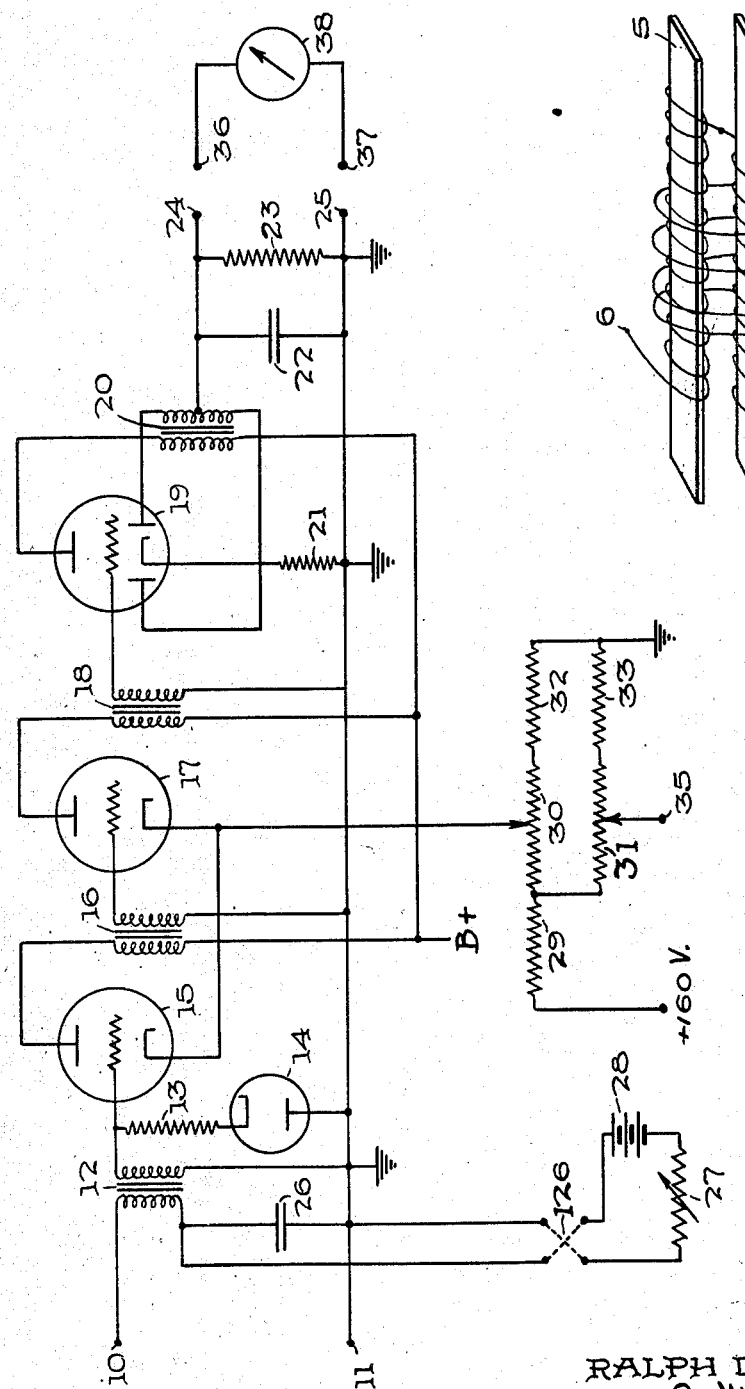
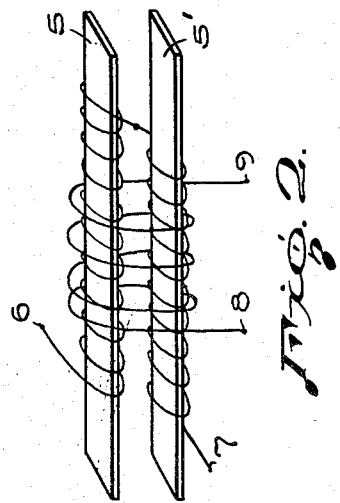
*Fig. 2.*
*Fig. 3.*
INVENTOR.
RALPH D. WYCKOFF
BY A. M. Houghton
ATTORNEY Inventor
RALPH D. WYCKOFF
By [signature]
His Attorney

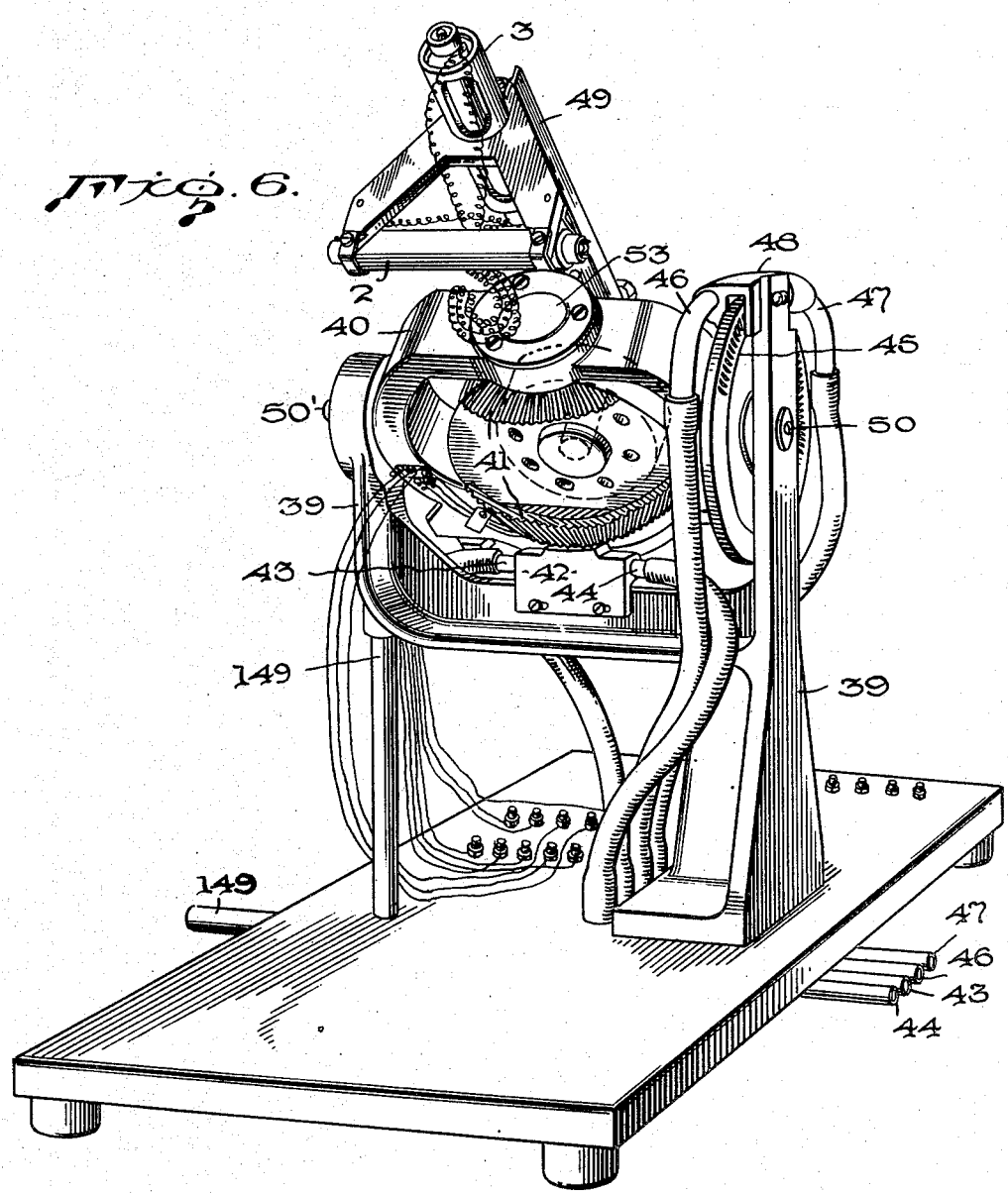

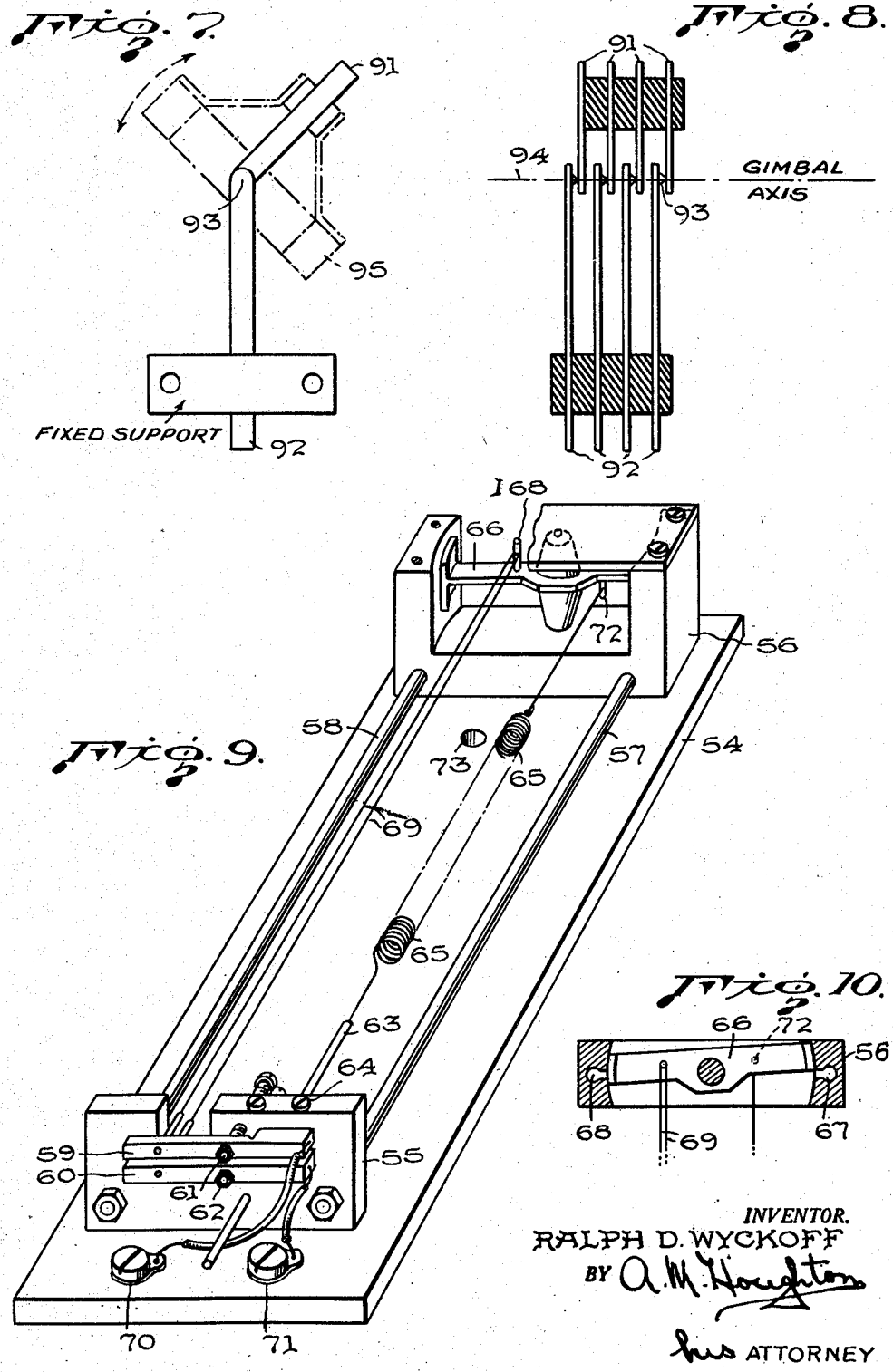

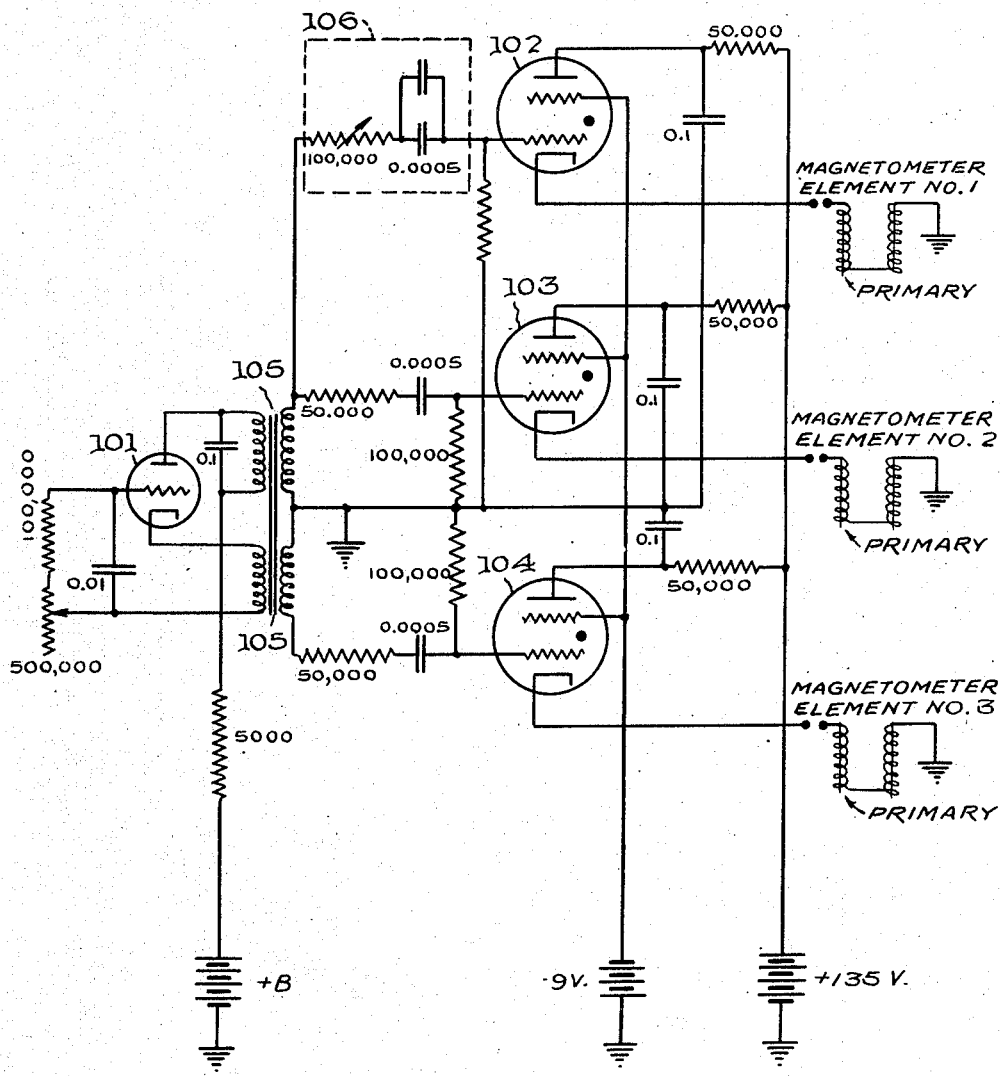

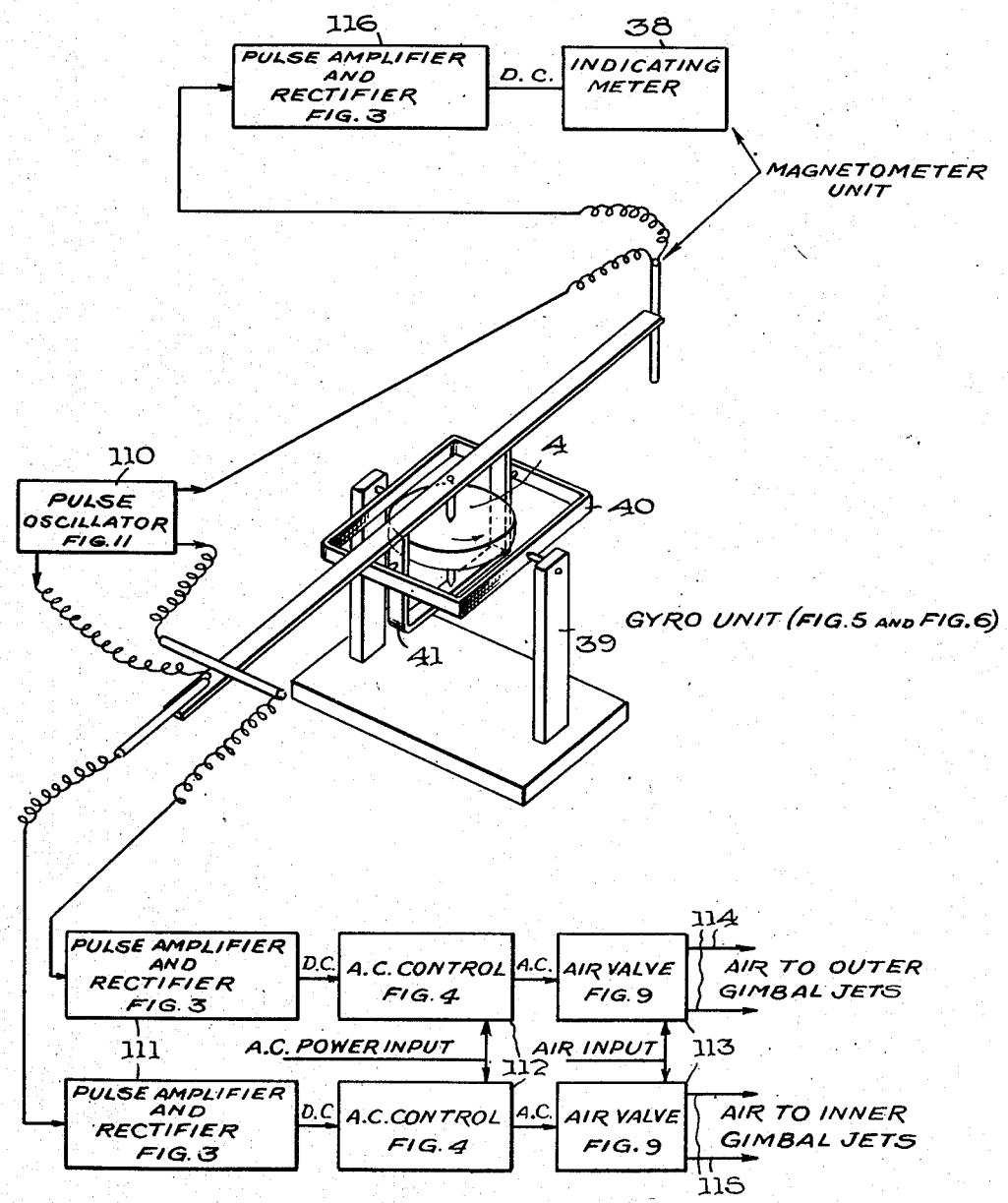

Patented Aug. 15, 1950

2,518,513

UNITED STATES PATENT OFFICE 2,518,513

METHOD AND APPARATUS FOR MEASURING MAGNETIC FIELDS

Ralph D. Wyckoff, Pittsburgh, Pa., assignor to Gulf Research & Development Company, Pittsburgh, Pa., a corporation of Delaware Application July 5, 1945, Serial No. 603,309

4 Claims. (Cl. 175—183)

This invention relates to improvements in apparatus for measuring magnetic fields and particularly to a magnetometer which is gyro stabilized with respect to the magnetic horizon whereby accurate magnetic intensity measurements may be continuously made from relatively unsteady moving vehicles as air or marine craft.

Many practical problems involve the measurement of ambient magnetic fields with the maximum possible precision. For example, in geophysical exploration it is desired to map the intensity of the earth's magnetic field with the view to determine the existence and exact location of anomalous variations in field strength, which are indicative of geological anomalies. To be of value, such measurements should be reliable to within about 1 gamma, which is approximately 1 part in 50,000 of the total intensity of the earth's field. In other cases, it is desired to locate hidden masses such as submerged submarines or the like.

In all such cases, the unique value of the measuring device resides in its ability to detect and map the magnetic anomalies while traversing the area rapidly by means of aircraft or surface vehicles. However, since the magnetic anomalies to be detected are of very small intensity and are superposed on the total earth's field, the desired local variations may be observed only as small perturbations in the total magnetic intensity. Thus, there exists the problem of maintaining the orientation of the measuring device to a very high degree of precision with respect to the earth's field; otherwise, mere orientation changes due to normal maneuvering of the carrying craft would give rise to spurious indications completely masking the true magnetic anomalies.

Instruments have been developed in which the magnetically sensitive element comprises an electromagnetic unit having no moving parts, the construction being such that when cyclically excited by a suitable power source, the electrical output of the device is dependent upon the ambient magnetic intensity. These devices, frequently referred to as "flux-gate" magnetometers, represent the general type of magnetically sensitive elements which are the subject of the present invention. Since instruments of the flux-gate class contain no mechanically moving parts within the measuring device itself, they are singularly suited to magnetic intensity meters for use on moving vehicles and have, in fact, been adapted to such devices.

In the case of an instrument intended for use in mapping the earth's magnetic field or any natural or artificial anomalies superposed thereon, the sensitive magnetometric element will be subject to the total intensity of that field if maintained with its axis in fixed orientation parallel to the total intensity vector. It will also be evident that in this position, with respect to the total vector, an axial misalignment will result in a decrease in the observed magnetic intensity by an amount proportional to the cosine of the angle of alignment error. Thus, assuming a total intensity of 50,000 gammas, a spurious anomaly amounting to 1 gamma would be produced by even a momentary misalignment of about 22 minutes of arc.

Now it has been shown possible to use magnetometer elements of the flux-gate class, with suitable auxiliary electronic devices and associated indicating and recording instruments, to measure changes in ambient magnetic field intensity within 1 gamma. However, when such an instrument is mounted on a moving vehicle subject to random spatial orientations, the problem of maintaining the axis of the magnetic element in fixed relation parallel to the earth's vector within a few minutes of arc becomes a most serious problem. This exacting requirement must be met by mechanically operated servo mechanisms, and the purpose of this invention is to provide an improved method and means for meeting the requirement with a high degree of accuracy and stability. Thus, while a servo mechanism may be made to maintain orientation within almost any arbitrarily small amplitude, such precision is attained only by sacrificing speed of operation, since both speed and precision together in the operation of a servo device are incompatible—one can be attained only by sacrifice of the other.

It will be evident that in the case of a magnetometer of the above type transported on a moving vehicle, there may be very sudden changes in spatial orientation of the vehicle which must be eradicated by equally rapid response of the servo mechanism which maintains the magnetometer alignment. In the heretofore known devices the attainable sensitivity of the magnetometer depends upon the inherent operational stability of the vehicle used for transportation. Very slow changes in orientation of the vehicle have been amenable to precise correction by known magnetometric servo mechanisms, whereas rapid fluctuations can be handled only by sacrifice in operational sensitivity of the magnetometer.

It is the purpose of the present invention to eliminate the problem presented by vehicular characteristics by mounting the magnetometer element on a gyro-stabilized support. Since the orientation of a gyro can be changed only by precessional phenomena which characteristically are very slow period variations, the gyro itself will attain a first-order orientation of the magnetometer quite independent of any rapid changes in yaw or pitch of the transporting vehicle. Such drifts as may occur in the gyro-stabilized element will represent the integrated precessional effect of yaw and pitch transmitted to the gyro through frictional resistance of the gimbal-support bearings and related linkages, or similar precessional effects due to imperfect gravitational balance of the system.

Thus, while gyro-stabilization of the magnetometer will not of itself maintain proper orientation over long periods of time the gyro will serve to limit the rate at which misalignment may occur. In effect the gyro maintains a first-order stabilization which prevents all rapid fluctuations from reaching the magnetometer element thus leaving to the magnetic servo equipment only long-period alignment duties which it is best suited to accomplish without undue sacrifice of accuracy.

It is accordingly an object of this invention to provide a method of stabilizing a magnetometer against large and rapid movements of the vehicle by which it is transported.

It is a further object of this invention to provide means by which a magnetometer may be held in the magnetic vector to a very high degree of accuracy regardless of the magnitude and rapidity of orientation changes of the vehicle by which it is being transported.

It is a further object of this invention to provide a magnetometer whose spatial stability is such that substantially continuous magnetic intensity measurements may be made with a high degree of accuracy.

It is a further object of this invention to provide gyroscopic stabilization for a flux-gate magnetometer together with auxiliary flux-gate elements to control the precession of the gyro so as to hold the magnetometer in the magnetic vector at all times.

An ancillary object of this invention is the provision of sequential pulse excitation of the several flux-gate magnetometric elements comprising the apparatus, thus eliminating mutual interaction between them.

Another ancillary object of this invention is the provision of a non-magnetic servo device for controlling the magnetic orientation of a gyro stabilized magnetometer, thus eliminating all spurious magnetic effects caused by servo operation.

Still another ancillary object of this invention is the provision of an electro-thermal differential air valve used in conjunction with a magnetic horizon gyro stabilized magnetometer, said electro-thermal device having low thermal capacity and being substantially devoid of extraneous stray magnetic field.

These and other objects are accomplished in the manner described in the following specification which may be more fully understood by reference to the appended drawings forming a part thereof and in which:

Figure 1 is a schematic geometrical diagram for illustrating the principle underlying my invention, Figure 2 shows one type of flux-gate magnetometer which may be used in my invention, Figure 3 is a circuit diagram of an amplifier which may be used to amplify the flux-gate output, Figure 4 is a circuit diagram of a control circuit which may be used to supply controlled A.-C. power to a differential valve, Figures 5 and 6 are drawings of one embodiment of a magnetometer stabilized in the manner of my invention, Figures 7 and 8 show a form of flexible electrical connection which may be used, Figures 9 and 10 show a form of differential valve which may be used, Figure 11 is a circuit diagram of a sequential pulse generator which may be used to energize the flux-gate magnetometer elements, and Figure 12 is a schematic block diagram illustrating one form of my invention.

One method by which the complete stabilization of a flux-gate type magnetometer may be accomplished is shown schematically in Fig. 1 where a first-order stabilization is accomplished by the gyro alone. However, such slow-period perturbations in orientation as reach the magnetic element through precessional motion of the gyro due to imperfect balance or frictional or other forces at the gimbal bearings, are eliminated by servo forces imposed on the gyro which result in corrective precessional motions. The necessary corrective servo forces are imposed by magnetic indications derived from suitably disposed magnetometer elements as more fully explained below.

In Fig. 1, $\phi$ represents the spatial direction of the earth's total magnetic vector and ABCD is the magnetic horizon, i. e., a plane normal to that vector; I is a magnetometer element suitable for measurement of the magnetic intensity along its axis and which must be maintained normal to plane ABCD and hence parallel to the magnetic vector $\phi$; 4 is a free gyro (double gimbal mounting) whose gimbals are mechanically related to a plane A'B'C'D' such that the spatial orientation of this plane is determined by the orientation of the gyro. Magnetometer element I is rigidly attached to plane A' B' C' D'. Additional magnetometer elements 2 and 3 with axes at right angles to each other are mounted on plane A'B'C'D' with their axes parallel to that plane.

Functionally the performance of this schematically illustrated system is as follows. We may assume that initially A'B'C'D' and ABCD are coplanar, and with no external forces acting gyro 4 maintains this coplanar relation. Magnetometer element I will then be parallel to the earth's total magnetic vector $\phi$ and its output will be a measure of the total magnetic intensity as desired. Magnetometer elements 2 and 3, each of whose axes are normal to the magnetic vector will observe zero magnetic intensity.

Now let some accidental disturbance transmit a precessional force to the gyro. The gyro will respond by a slow precession, tilting plane A'B'C'D' from its desired position. But immediately magnetometer elements 2 and 3 will no longer be normal to the vector $\phi$ and will experience a magnetic intensity equal to $\phi$ multiplied by the sin of the orientation error. As a result, there will be an electrical output from these elements proportional to the alignment error which, through suitable electronic devices, may be applied to the gyro as a corrective precessional force.

Thus, assuming that element 2 is tilted out of the plane ABCD by a spurious tilt of the gyro 4, the resultant electrical output from element 2 may be applied as a force $f_2$ acting about the gimbal axis 3' to cause a corrective precession of the gyro about axis 2'. This corrective motion will continue until element 2 is again aligned in plane ABCD when it experiences no magnetic field and its electrical output falls to zero and removes the precessing force $f_2$. Since there is no precessional inertia in the gyro, its corrective motion stops when the force $f_2$ is eliminated and no overshoot will occur unless time lags exist in the electronic and mechanical link between element 2 and the force applicator.

In a similar manner, if element 3 is tilted out of its proper plane, a precessional force $f_3$ is called into action about gimbal axis 2' resulting in a corrective precession about axis 3' which brings element 3 back into the proper plane ABCD.

The above actions may occur singly or simultaneously so that the plane A'B'C'D' of elements 2 and 3 is held by servo action in a plane always parallel to plane ABCD, and since the measuring element 1 is fixed normal to plane A'B'C'D' it is held parallel to the magnetic vector $\phi$ as required for accurate measurements.

Attention is called to the fact that for a given small spurious deflection of the plane A'B'C'D' out of the plane ABCD, the output of elements 2 and 3, applicable to the servos for correction, is large compared with the spurious output introduced in measuring element 1. Thus, assuming the earth's total intensity to be 50,000 gamma, the component of magnetic intensity experienced by either element 2 or 3 when tilted out of the magnetic horizon by a small angle $\theta$ is, $$\Delta\phi_{2,3}=50,000 \sin \theta=0.242\ \theta$$

where $\theta$ is expressed in seconds of arc.

On the other hand the sensitivity of measuring element 1 to departures from parallelism with vector $\phi$ is, $$\Delta\phi_1=50,000\ (1-\cos \theta)=0.588\times 10^{-6}\ \theta^2$$

where $\theta$ is expressed in seconds of arc.

Thus, while a tilt of almost 22 minutes of arc is required to produce a spurious indication of 1 gamma at the measuring element 1, a tilt of only 4 seconds of arc will produce a 1 gamma signal at the servo-control elements 2 or 3. Obviously this is a very favorable condition from the viewpoint of securing sufficiently accurate alignment of element 1 to permit reliable measurements of small anomalies in the earth's magnetic field.

I have described in principle the operation of the magnetometer assembly comprising a magnetometer or field-measuring element mounted normal to a plane containing two additional magnetically sensitive elements whose axes lie in that plane but mutually at right angles to each other and respectively parallel to the axes of the outer and inner gimbals of a stabilizing gyro. The means whereby said plane is automatically oriented and gyro stabilized in the magnetic horizon, as required, will be outlined in detail with reference to Figs. 2 to 12.

In Fig. 2 is shown schematically the construction of magnetometer elements 1, 2 and 3 of Fig. 1. These are of the type fully described in U. S. Patent No. 2,406,870 of Victor V. Vacquier. In Fig. 2, 5 and 5' are a pair of parallel transformer cores comprising single strips of very thin magnetic material having high permeability and low energy requirements for saturation. Suitable materials are Hypernik, Mu-metal or Permalloy or the like. The cores are provided with primary coils oppositely wound or so connected that the magnetizations of the cores are in opposite directions when an exciting current is applied at terminals 6 and 7. For best performance these primary coils should be well balanced electrically. The transformer cores may be left open or, alternatively and with some advantage, the ferro-magnetic core may be closed at the ends to form a closed primary magnetic circuit. Surrounding both cores is a single secondary winding of many turns and low distributed capacity with terminals 8, 9.

The performance of this sensitive element is fully described in the above mentioned Patent No. 2,406,870 of Vacquier. Briefly, it may be said that primary terminals 6, 7 are connected to a source of alternating current, or more preferably to a source of pulses of current having sufficient magnitude to carry the magnetization of the core well beyond the saturation point. The frequency of the A.-C. or pulses may have any reasonable value from a few cycles per second to 1000 cycles or more. The higher the frequency used the simpler becomes the problem of designing the auxiliary electronic circuits, except, if the frequency is made too high, difficulty may be encountered in handling the excessively sharp pulses that are produced at the secondary. A frequency of several hundred to 1000 cycles will be found practical.

When the primary coils are excited in the above described manner, and if the transformer element, Fig. 2, is in zero magnetic field, then the output at the secondary terminals 8, 9 will be zero or substantially so, if the cores and windings are well balanced electrically. However, if the transformer element be exposed to an ambient magnetic field having a component parallel to the cores amounting to only a few gamma, then a sharp pulse of essentially undirectional voltage will appear at the secondary terminals. The magnitude of the pulse will be proportional to the ambient magnetic field intensity and its polarity will depend on the direction of the magnetic field.

In order to make practical use of the output of the magnetometer element, either for measuring purposes or to actuate servo mechanisms, the sharp pulses derived from the magnetometer may be accentuated by suitable electronic amplifiers and delivered to rectifiers whereby useful energy may be obtained in a manner analogous to the operation of electronic peak-voltmeters.

Fig. 3 shows schematically an amplifier suitable for amplification of the magnetometric voltage pulses. Input terminals 10 and 11 are connected to the magnetometer terminals 8 and 9 of Fig. 2. Transformer 12, of the miniature iron-cored type suitable for high frequencies, transfers these pulses with a suitable voltage step-up to the grid of tube 15. Only positive pulses are desired on the grid of tube 15 and to eliminate certain undesirable signals appearing at the secondary of the magnetometer, a rectifier 14 bypasses through resistance 13 (about 0.2 megohm) any negative pulses and thereby attenuates them considerably as seen by the grid of tube 15. The pulse output of tube 15 is further amplified by transfer through transformer 16 to tube 17, thence through transformer 18 to the grid of tube 19. The plate circuit of tube 19 containing transformer 20 includes a conventional full wave rectifier circuit with filter 22, 23 so that the final output of the amplifier appears at terminals 24 and 25 as a direct voltage whose magnitude is proportional to the peak voltage of the magnetometer element output. Tubes 15, 16 and 17 may be of known types, for example 15 and 16 may be type 6SN7 and 19 may be type 6SQ7.

Since the sensitive range of the magnetometer elements is limited by saturation effects in the very high permeability cores, they cannot be used over the entire range of the earth's field. Hence, in the magnetometer element 1 of Fig. 1, which is exposed to the total intensity vector $\phi$, the magnetization to which the cores are exposed must be held within reasonable limits. Moreover, it would be impracticable to design an amplifier or associated indicating meter to give significant readings to within a few gamma if the circuits were handling signals equivalent to some 50,000 gamma. These circumstances may be taken care of by the use of compensating circuits whereby an adjustable compensating field is applied to the core 5, Fig. 2, of the magnetometer element, the compensating field being adjusted to buck out all but a reasonably small part of the ambient earth's field. This compensating field is conveniently obtained as shown in Fig. 3. Thus, a condenser 26 is introduced in series with the primary circuit of input transformer 12. This condenser permits the insertion of a D.-C. supply 28 and rheostat 27 whereby a direct current of any desired value may be imposed on the secondary 8, 9, Fig. 2, of the magnetometer element, said direct current being adjusted by rheostat 27 to such a value that the resultant field applied to cores 5, 5' is almost equal to the ambient earth's field. A reversing switch 126 serves to control the polarity of the applied field so that it is in opposition to the ambient field. It will be noted that condenser 26 serves as a bypass for the high frequency pulse signals so that the auxiliary D.-C. compensating circuit does not appreciably affect the input to the amplifier.

Since the magnetic field intensity measured by elements of the type described is exhibited by the amplitude of sharp voltage pulses appearing at the secondary terminals, it is desirable to provide an adjustable bias for tubes 15 and 17. This bias provides a cut-off eliminating some small extraneous peaks appearing at the secondary terminals of the magnetic elements due to imperfect electrical balance of the two sections of the core. Thus, by proper adjustment of this bias the small extraneous signals are cut off and only the desired voltage peaks reach the grids of the amplifier tubes. One method of providing this bias is shown in Fig. 3 wherein the voltage divider comprising elements 29, 30 and 32 permits an adjustable voltage to be applied to the cathode terminals and ground, thus applying a corresponding negative bias to the grids. This bias network is shown containing additional resistors 31 and 33 whereby a similar adjustable bias voltage may be obtained at terminal 35 for use in another channel comprising an identical amplifier. The use of a two-channel amplifier of the above type will become apparent in connection with the equipment described in Fig. 12.

A sensitive element of the type described in Fig. 2 and used in conjunction with an amplifier of the type shown in Fig. 3, together with a suitably sensitive indicating or recording meter 38 of a type well known to the art operating from terminals 24, 25, Fig. 3, will evidently serve as a sensitive magnetometer in which small variations of the ambient field imposed on the sensitive element will be exhibited in the readings of meter 38. This assembly corresponds to the magnetometer element 1, shown schematically in Fig. 1. It remains to be shown how elements 2 and 3 serve to hold element 1 parallel to the magnetic vector $\phi$.

In Fig. 4 is shown an additional controller circuit unit designed to produce an A.-C. output controlled by the D.-C. output of the amplifier of Fig. 3. In principle, the circuit operates by using the grid controlled rectifier action of the tubes 80 and 81, which may for example be type 6V6. Two other tubes 83 and 84 which may be of type 5Y3GT/G are connected as shown. The A.-C. supply to the power transformer 82 provides suitable voltages $x-x$, $y-y$ and $z-z$ for the filaments of the tubes 83, 84, 80 and 81, as well as a high voltage from the secondary 85 which excites the plate circuits of the tubes. Transformer 86 is in series with the secondary 85, and comprises a primary coil 87 of suitable impedance to match the tube circuit impedance and a secondary coil 88 to match a low resistance load connected to terminals 90.

It will be evident that during one-half of the A.-C. power cycle the secondary circuit is completed via one of the low impedance gas tubes 83, 84, and the opposite 6V6 tubes 80, 81, while on the other half of the cycle the circuit is completed via the other pair of tubes. Since transformer 86 is in series with this secondary circuit, an A.-C. output will appear at terminals 90 of its secondary 88. However, if the grids of the 6V6 tubes 80, 81, carry a high negative bias, they will both be blocked and no current will flow through the plate circuit and no voltage will appear at the secondary terminals 90 of transformer 86. For any intermediate value of negative bias on the grids, current will flow in the plate circuits for a portion of the A.-C. cycle as in the well known action of such a grid-controlled rectifier. Thus, the amount of A.-C. power supplied to the primary 87 of the output transformer 86 will be governed by the magnitude of the D.-C. bias applied to the grids of the 6V6 tubes 80 and 81. The nonsinusoidal nature of the current applied to transformer 86 by this circuit may be considerably smoothed by shunting its primary winding 87 with a condenser 89 which tunes the primary to approximately the frequency of the A.-C. supply. The A.-C. supply may conveniently be 110 volt, 60 cycle power.

For use in the servo channels it is the intention that the grid-controlltd A.-C. amplifier-rectifier of Fig. 4 be used in conjunction with the pulse amplifier and rectifier of Fig. 3 by connection at their common terminals 24 and 25. Terminals 10 and 11 of Fig. 3 are in turn connected to the secondary output terminals 8 and 9 of one of the magnetically sensitive elements of Fig. 2. This combination, comprising the electrical portion of a complete servo channel, exhibits sufficient sensitivity that when the magnetic element (Fig. 2) is in the earth's magnetic horizon and hence in zero ambient field, about 10 watts of electrical output may be derived at the load terminals 90 of the final amplifier, but when the magnetic element is tilted out of the magnetic horizon by about 30 minutes of arc, the grids of the 6V6 tubes 80, 81, Fig. 4, are completely blocked and the output of the final amplifier falls to zero. Thus, a 30 minute error in orientation of the magnetic element provides some 10 watts of electrical power available for actuating a servo orienting mechanism.

Now it is the principal object of this invention to disclose a servo-orienting means in which a first-order stabilization of the magnetic elements in the magnetic horizon is secured by gyroscope action alone, and in which the automatic orientation is secured and accurately maintained by superposing the necessary servo action on the gyroscope through precessional action of the gyro. Thus, the servo action is called into play only to correct the relatively long-period misalignments which are not righted by the gyro itself. Having described the essential electrical circuits comprising a single servo channel, the mechanical arrangements of the gyroscopic system and related servo mechanism may be decribed.

Figs. 5 and 6 show the mechanical arrangement of one embodiment of the principles which comprise the subject of this invention. In these figures, numeral 39 indicates a support carrying non-magnetic ball bearings at 50, 50' and comprising the support for outer gimbal 40. This gimbal in turn carries similar bearings as at 53 which support the inner gimbal comprising a gyroscope case 41 in which is housed a conventional air-driven gyro whose axis of rotation is at right angles to the axis of the inner gimbal or case 41.

Rigidly mounted to the gyro case and in a plane parallel to the plane of rotation of the gyro wheel is the support member 49. At one end of this support member is the pair of magnetic elements 2 and 3 whose axes are parallel respectively to axis 50—50' of the outer gimbal and axis 53 of the inner gimbal. At the other end of support 49 is mounted magnetometer element 1 held in an annular rubber-ring clamp at 150 which permits adjustable alignment of the magnetometer axis by adjusting screws 52 in the support ring 151 attached rigidly to support 49. This adjustment of the magnetometer axis is necessary in order that it may be made accurately normal to a plane parallel to the axes of elements 2 and 3.

It will be noted in Fig. 6 that the bottom section of the gyro case comprises a hemispherical shape 41 carrying circumferential flutes parallel to the axis and covering the entire surface of the hemisphere. Centered immediately below the hemisphere 41 and mounted on support 39 is a double-jet nozzle assembly fed by air lines 43 and 44. These nozzles comprise jets which impinge in opposite directions on the hemisphere and at right angles to the flutes. Thus, when air is admitted through port 44 the corresponding jet drives the gyro housing clockwise while air through port 43 will drive it in the opposite direction.

Similarly, on the axis of the outer gimbal is mounted a disc 45 which on one face carries milled cups suitable to drive the outer gimbal counterclockwise when a jet from port 47 impinges on the face of the disc from a nozzle in the nozzle-assembly 48. On the opposite face of disc 45 is a similar set of cups and a nozzle which drives the disc in the opposite direction when air is applied through port 46.

The gyro wheel contained in the case 41 may be an air driven type well known to the art and derives its power from air jets supplied through port 149 thence through bearing housing 50', through hollow gimbal 40, through inner-gimbal bearing housing 53 to the gyro case. The mechanical details of these bearings are also well known in the art.

As in all gyroscope applications, all bearings must be designed for minimum friction and in this case must be constructed of non-magnetic material such as K-Monel or beryllium copper of suitable hardness. Likewise, the entire gimbal assembly must be carefully balanced gravitationally. Furthermore, the necessary electrical leads must be brought into the magnetic elements in such manner as to present the minimum possible spurious torque to the gimbals. This may be accomplished by the well known means illustrated in Figs. 7 and 8 but not shown on the assembly figures 5 and 6 in the interests of clarity of essential parts. Figs. 7 and 8 show how a series of electrical terminals 91 coming from the magnetometric elements 1, 2 and 3 on support member 49 may be transferred to terminals 92 on a fixed support without introducing spurious torques. The terminals 91 comprise multi-leaved contact springs insulated from each other. These are contacted by the fixed contact springs 92, contact being restricted to a small area 93, each such contact area being on the axis 94 of gimbal rotation. Thus contacts 91 may be rotated with respect to contacts 92 on the gimbal axis 94 with only a minimum of friction and with no extraneous torque. Gimbal 95 is shown in phantom in Fig. 7 since it may comprise either the inner or outer gimbal, both of which require a contact system such as shown in Figs. 7 and 8.

As is well known from the theory of gyroscopic action, the performance of the gyro assembly of Fig. 6 will be as follows: A signal from element 2 indicating that it has tilted out of the magnetic "horizon" may be applied to a suitable valve which supplies compressed air to port 47. The reaction of this air-jet on wheel 45 puts a torque on gimbal 40 which is exhibited as a rotation of the inner case and hence of element 2 such as to return the element into the magnetic horizon. No motion of gimbal 40 will be exhibited though torque has been applied to it. Similarly, if element 2 has tilted out of the magnetic horizon in the opposite direction, suitable valve action would have applied air through port 46 causing an opposite torque on gimbal 40 and a resulting reverse precession of the gyro such as to return element 2 into the magnetic horizon.

In a similar manner, indications from element 3 causes jets from ports 43 or 44 to react on the fluted surface of the inner-gimbal hemisphere 41 producing torques which react on the gyro to cause precession about the axis of the outer gimbal, thus returning element 3 into the magnetic horizon.

Now it will be evident that with the gyro support held stationary, and with the magnetically sensitive elements 2 and 3 coupled to the air-jet servo mechanism in proper phase, the inner gimbal or gyro will automatically precess into such orientation as to place the axes of these elements in the magnetic horizon normal to the ambient or earth's magnetic vector—since this is the only orientation at which their electrical output will be zero. It will also be evident that the support 39 may be subject to yaw and pitch motions, either slow or rapid, and the orientation of the magnetic elements will remain unaltered within the scope of the gyrostabilizing forces. Actually, bearing friction and related torques will cause some spurious precession of the gyro, the amount of which will depend on the gyroscopic moment in relation to the spurious torques developed. However, if the precessional torques called into play by the servo-jets are relatively large compared with those caused by motion of the support, the resultant deviation of the elements 2 and 3 from the magnetic horizon may be made very small. Thus, the magnetometer element 1 is held accurately parallel to the total magnetic vector as required.

The means whereby the magnetic elements 2 and 3 are coupled to the servo jets may take any of a number of forms and I do not limit this means to any specific method. However, as is well known in the servo art, the time lags between actuating signals and the application or removal of servo power must be made as small as possible to avoid hunting action. In using the precessional motion of the gyro as part of the servo mechanism advantage is gained in that the precessional motion is dead-beat. Hence here the problem resolves itself into the elimination of time lags between the signals from the magnetic elements and the application or removal of the torques at the gimbals, that is, between the electrical signals and the air-jets. Considering the time lags in causing air to traverse the tubes connecting the necessary valves and the nozzles, it is clear that relatively high pressure and large tubes and valve-ports are desirable. Moreover, the length of conduit between the valves and nozzles should be minimized.

A further and obvious requirement is that the valve actuator should not cause magnetic disturbances which would be detected by the magnetometer elements. For the latter reason, it is desirable to use alternating current in any actuator circuits which may give rise to stray magnetic fields since for a given intensity of the stray field, the effect of the A.-C. field on the final output of the associated circuits will be less than that caused by a unidirectional field. The effect of an alternating field will be to produce an amplitude modulation on the amplifier output which in turn will be reflected in the output rectifier circuit. The modulation present in the amplifier output will be the beat frequency between the stray field and the frequency of the exciting-current pulses applied to the primaries of the magnetic elements.

One method whereby the air-valves may be actuated with a minimum production of stray fields is shown in Fig. 9. In this figure is shown a base 54 carrying a support of insulating material 55, a valve assembly 56 and tie-rods 57 and 58 which serve to maintain a fixed distance between 55 and 56. The valve assembly 56, more clearly shown in section in Fig. 10, comprises two ports 67 and 68 terminating at hose connection ports not shown under base 54. These ports terminate in narrow rectangular slots at diametrically opposite points on the inner face of the cylindrical section of 56. The long axes of the slots are parallel with the turning axis of the rotor member 66. Cylindrical lips on each end of the member 66 serve to cover the valve ports such that a slight rotation of 66 in a clockwise direction closes port 67 while uncovering port 68. In neutral position, i. e. when member 66 is symmetrically positioned, the leading edges of the valve lips uncover ½ of ports 67 and 68 so as to permit a symmetrical flow of air through these ports.

The rotary valve member 66 is actuated in a clockwise direction by spring 65 attached at 72 and provided with an adjusting anchor 63 locked by screw 64. The tension of spring 65 is opposed by the tension of a continuous hair-pin loop of fine wire 69 supported over insulating post 168 on valve member 66 and at the opposite end by members 59 and 60 having suitable adjusting screws and locks 61 and 62. Members 59 and 60 are electrically connected to terminal posts 70 and 71 such that when a current is applied at these terminals the loop of fine wire 69 carries this current and is heated to a relatively high temperature thereby. It is important that a fine wire be used not only to attain sensitivity, but the heat capacity of the thermal actuating element must be minimized so as to reduce time lags which would induce hunting in the system. The material of this wire should be such that the tensile properties are not seriously altered by high temperatures since proper adjustment of the valve depends on maintaining a fixed length of wire regardless of many cycles of heating and cooling of the wire. Nichrome wire has been found satisfactory.

It will now be evident that the valve assembly may be adjusted so that with a small current applied to terminals 70 and 71 the temperature of the wire loop 69 will be low and the wire will be contracted pulling against spring 65 and rotating the valve counterclockwise to open port 67 and close port 68. On the other hand, a sufficiently large current will heat the fine wire loop which by thermal expansion will permit spring 65 to rotate the valve clockwise, thus closing port 67 and uncovering 68.

The clearance between the rotating and the fixed cylindrical faces of the valve is made as small as possible without causing actual contact. This avoids friction.

The entire valve actuating assembly is covered by an airtight case (not shown) which seals against base 54 except for port 73 which opens at a suitable hose connection not shown under the base. A source of air pressure is applied at port 73 which maintains pressure within the case and comprises the source of air which flows through and out ports 67 and 68 or both, depending upon the relative areas of the port openings determined by the angular position of valve member 66.

As already explained, in neutral valve position an equal amount of air will flow out through ports 67 and 68 and any angular departure of member 66 from neutral will result in an unbalance of air flow through these ports. Referring now to Fig. 5 and Fig. 6, if ports 67 and 68 of Fig. 9 are connected by a suitable conduit to ports 46 and 47 of the gyro assembly, a flow of air will impinge on disc 45 from jets associated with 46 or 47. If port 47 delivers more air to jet 48, a counterclockwise torque will be imposed on the outer gimbal 40 which will precess the inner gimbal. Likewise, a reversed unbalance of the air jets will reverse the direction of precession of the inner gimbal. However, if the airflow to the jets is balanced, no net torque is delivered and there is no action on the gyro.

Evidently, a similar valve arrangement may be used to supply air to ports 43 and 44 of Fig. 5 and Fig. 6 and would permit similar control of the outer gimbal through precessional torques applied to the fluted sphere of the inner gimbal gyro case. Thus, through the use of two independent channels each comprising a magnetic element 2 or 3 of Fig. 1, amplifiers such as Figs. 3 and 4, and electrically actuated air valve Fig. 9, the gyro may be completely and automatically stabilized so that its plane of rotation is always parallel to the magnetic horizon. Magnetometer element 1, Figs. 1 and 5, fixedly mounted normal to that plane will thus be maintained parallel to the earth's total magnetic vector as required.

Attention is called to the adjustments necessary in each servo channel in order that the servo-stabilized orientation of the magnetometer element parallel to the magnetic vector may be made as desired. Consideration of the foregoing discussion will make clear that the signals from the magnetic elements will operate the servo mechanism in only one direction. For, while the signals from the elements will reverse polarity if the ambient field is reversed, the associated pulse amplifier will operate only on positive signals at the grids due to bias voltages imposed. Moreover, it is a fact that in passing through zero field the flux-gate elements are unsatisfactory due to the presence of spurious signals of small amplitude. It is desirable therefore to operate the flux-gate elements above a certain magnetic level where the signals are clean and distinct rather than attempt to stabilize in exactly zero field, i. e., elements parallel to the magnetic horizon. Thus, in practice the adjustments of the air-valve actuators and the signal sensitivity of the amplifier channels are made such that the magnetic elements are stabilized at a slight angle to the magnetic horizon. Recalling that the over-all sensitivity of the servo channels is such that full torque in one direction to full torque in the opposite direction involves a change in angle of the magnetic element of only 30 minutes of arc, the actual operating point of stabilized position of the element may be within say 15 minutes of arc of being parallel to the true magnetic horizon.

In the description of the design of the magnetic elements of Fig. 2 it has been mentioned that the primary windings of these elements are excited by either A.-C. or pulses of current having sufficient magnitude to carry the cores well past their saturation point, all as described in detail in V. V. Vacquier's Patent No. 2,406,870. It has been mentioned, however, that in some respects pulse excitation is to be preferred. In the arrangement of magnetic elements necessary to carry out the purposes of this invention, the pulse excitation is definitely preferable. It will be noted that especially in the case of elements 2 and 3, Figs. 1, 5 and 6, they are most conveniently mounted in close proximity to each other under which condition stray fields from the primary excitation of one element may subject the other to a resultant spurious magnetic field. And while these elements should then normally be mounted at right angles to each other in which case the mutual induction between them would be zero, this adjustment might not be exact. This problem is eliminated by using pulse excitation with a dormant time interval between pulses. Each of the three elements may then be excited at different times by merely shifting the phase of the three primary pulses. Thus, at the instant any one element is activated, the others are dormant and no stray field due to their primary excitation can exist.

Fig. 11 shows one method of producing the required pulses. A master oscillator 101 operating at the desired pulse frequency, say 200 to 1000 cycles per second, drives three tubes 102, 103 and 104 which are triggered by the master oscillator. Tubes 102, 103, 104 may be type 2050 gas tubes. As will be seen from the Fig. 11, the grids of the trigger tubes 103 and 104 which supply magnetometric elements 2 and 3 are connected to the output transformer 105 of the master oscillator in a 180° phase relation. And since the trigger action takes place only on the positive half of the grid excitation, the circuits of tubes 103 and 104 will be activated and produce pulses in their respective number 2 and 3 magnetometer element primary circuits in alternate sequence. Similarly, the triggering energy fed to the grid of the circuit of tube 102 is shifted in time with respect to either that of 103 or 104 by means of the adjustable capacity-resistance phase-shifter 106 as indicated. The adjustment of the three trigger circuits to make certain that no two of them trigger in phase may be ascertained readily by observing the output pulse on a cathode ray oscillograph and thereafter the phase-shifter adjustment is held fixed. The type 2050 tube trigger circuit is not described in detail since any conventional circuit of this type may be used, suggested circuit values being shown in Fig. 11. The important feature is that the pulses be sequential, not simultaneous.

Fig. 12 shows schematically by block diagrams a complete assembly of components comprising a magnetometer gyro-stabilized in the magnetic horizon in the manner of my invention. Magnetometric elements 1, 2, 3 are the same as those indicated in Fig. 1 by the same numerals. A pulse oscillator 110 comprising the circuit of Fig. 11 excites the primary of each of the elements 1, 2, 3 in the sequential manner described. The secondary signal of elements 2 and 3 are used to influence the gyro 4 so that its precession will maintain the magnetometer 1 in the magnetic vector should external influences cause any departure therefrom. This is accomplished by passing these signals into amplifier 111 similar to Fig. 3, whose output controls the A.-C. passed by controllers 112 which are shown in detail in Fig. 4. The A.-C. output then operates a differential air valve 113 similar to Fig. 9 which in turn controls the air jets supplying the necessary torques to the gyro. It is to be noted that these air jet torques do not of themselves restore the orientation as would be the case in a simple servo-mechanism. The air jet torques merely urge the gyro to precess so as to restore its magnetic orientation, actual restoring motion being delivered by the gyro itself. Thus air jets 114, Fig. 12, merely urge outer gimbal 40 resulting in restoration of orientation of element 3 by precession induced rotation of gimbal 41. Similarly air jets 115 urge inner gimbal 41 resulting in restoration of orientation of element 2 by precession induced rotation of gimbal 40. Means other than air jets, for supplying the appropriate urging torques to the gyro may alternatively be employed. Having thus maintained magnetometer element 1 in the magnetic vector, its secondary output may be amplified by amplifier 116, similar to Fig. 3, and indicated or recorded on meter 38 in a conventional manner.

I have described one method of accomplishing the purpose of the present invention which is to secure a first-order stabilization of a flux-gate magnetometer element by means of gyrostatic stabilization alone, this in turn being supplemented by automatic orientation through precession of the gyro controlled by a pair of flux-gate elements which define a plane bearing a fixed angular relation to the magnetic horizon. Obvious modifications of details of the design as disclosed

What I claim is:

1. In a magnetometer comprising a supporting frame with outer and inner gimbals in which is mounted a gyro and three mutually-perpendicular magnetic-detecting elements fixed with respect to the gyro, means controlled by two of the magnetic-detecting elements to precess the gyro into a plane having a fixed relation with respect to the earth's magnetic field, and means for indicating the output of the third magnetic-detecting element; the improvement which comprises a partial spherical shell having a rough outer surface and fixed with respect to the gyro axis so that a diameter of said shell lies on the inner gimbal axis, a pair of oppositely-directed air jets on said supporting frame whose air impinges on said shell to respectively generate oppositely-directed torques about the inner gimbal axis, an impeller mounted on the outer gimbal axis, a pair of oppositely-directed air jets on said supporting frame whose air impinges on said impeller to respectively generate oppositely-directed torques about the outer gimbal axis, and electrically actuated valves controlled by the said two precession-controlling magnetic-detecting elements to respectively control the air flowing through said jets to cause precession of the gyro into the desired orientation.

2. In a magnetometer comprising a supporting frame with outer and inner gimbals in which is mounted a gyro and three mutually-perpendicular magnetic-detecting elements fixed with respect to the gyro, means controlled by two of the magnetic-detecting elements to precess the gyro into a plane having a fixed relation with respect to the earth's magnetic field, and means for indicating the output of the third magnetic-detecting element; the improvement which comprises a partial spherical shell having a rough outer surface and fixed with respect to the gyro axis so that a diameter of said shell lies on the inner gimbal axis, a pair of oppositely-directed air jets on said supporting frame whose air impinges on said shell to respectively generate oppositely-directed torques about the inner gimbal axis, an impeller mounted on the outer gimbal axis, a pair of oppositely-directed air jets on said supporting frame whose air impinges on said impeller to respectively generate oppositely-directed torques about the outer gimbal axis, and valves controlling the air flowing through said jets to cause precession of the gyro into the desired orientation, said valves being actuated by electric current flowing through thermally-expanding conductors of low thermal capacity and said electric current being controlled by said two precession-controlling magnetic-detecting elements.

3. In a magnetometer comprising a supporting frame with outer and inner gimbals in which is mounted a gyro and three mutually-perpendicular magnetic-detecting flux-valves fixed with respect to the gyro, means controlled by two of the flux-valves to precess the gyro into a plane having a fixed relation with respect to the earth's magnetic field, and means for indicating the output of the third flux-valve; the improvement which comprises means for exciting said three flux-valves with voltage pulses applied thereto in sequence whereby no two of said flux-valves are simultaneously excited and mutual interaction therebetween is eliminated.

4. In a magnetometer comprising a supporting frame with outer and inner gimbals in which is mounted a gyro and three mutually-perpendicular magnetic-detecting flux-valves fixed with respect to the gyro, means controlled by two of the flux-valves to precess the gyro into a plane having a fixed relation with respect to the earth's magnetic field, and means for indicating the output of the third flux-valve; the improvement which comprises a partial spherical shell having a rough outer surface and fixed with respect to the gyro axis so that a diameter of said shell lies on the inner gimbal axis, a pair of oppositely-directed air jets on said supporting frame whose air impinges on said shell to respectively generate oppositely-directed torques about the inner gimbal axis, an impeller mounted on the outer gimbal axis, a pair of oppositely-directed air jets on said supporting frame whose air impinges on said impeller to respectively generate oppositely-directed torques about the outer gimbal axis, remotely-located air valves controlling the air flowing through said jets to cause precession of the gyro into the desired orientation, said air valves being actuated by electric current flowing through thermally-expanding conductors of low thermal capacity and said electric current being controlled by said two precession-controlling flux-valves, and means for exciting said three flux-valves with voltage pulses applied thereto in sequence whereby no two of said flux-valves are simultaneously excited.

RALPH D. WYCKOFF.

REFERENCES CITED

The following references are of record in the file of this patent:

UNITED STATES PATENTS

| Number | Name | Date |
|---|---|---|
| 1,988,521 | Sperry et al. | Jan. 22, 1935 |
| 2,016,977 | Thomas | Oct. 8, 1935 |
| 2,027,393 | McCreary | Jan. 14, 1936 |
| 2,047,609 | Antranikian | July 14, 1936 |
| 2,053,154 | La Pierre | Sept. 1, 1936 |
| 2,204,292 | Barth | June 11, 1940 |
| 2,222,754 | Freydorf | Nov. 26, 1940 |
| 2,252,059 | Barth | Aug. 12, 1941 |
| 2,331,617 | Moore | Oct. 12, 1943 |
| 2,380,932 | Bates | Aug. 7, 1945 |
| 2,418,553 | Irwin | Apr. 8, 1947 |
| 2,468,554 | Hull | Apr. 26, 1949 |